(12) United States Patent
Campion

(10) Patent No.: US 7,450,692 B1
(45) Date of Patent: Nov. 11, 2008

(54) CONFERENCE CALL PEER-DRIVEN DEGRADED LINE DETECTION AND REMOVAL

(75) Inventor: Nicholas Francis Campion, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/062,450

(22) Filed: Apr. 3, 2008

(51) Int. Cl.
*H04M 1/24* (2006.01)
*H04M 3/42* (2006.01)

(52) U.S. Cl. ............... 379/1.01; 379/202.01; 379/22.08
(58) Field of Classification Search ....... 379/1.01–1.04, 379/22.07–22.08, 202.01
See application file for complete search history.

(56) References Cited

U.S. PATENT DOCUMENTS

| | | | |
|---|---|---|---|
| 5,408,526 | A | 4/1995 | McFarland et al. |
| 6,226,513 | B1 | 5/2001 | Wierzbicki et al. |
| 6,240,070 | B1 | 5/2001 | Kozdon et al. |
| 2003/0023672 | A1 | 1/2003 | Vaysman |
| 2005/0010407 | A1 | 1/2005 | Jaroker |
| 2007/0263087 | A1 | 11/2007 | Hong |

*Primary Examiner*—Rasha S Al-Aubaidi
(74) *Attorney, Agent, or Firm*—Maxvalueip, LLC

(57) ABSTRACT

An embodiment of this invention is about a method of determining which line is causing noise based on peer feedback. Instead of relying on special monitors or algorithms to determine which line is causing the noise, the participants of the call are paired up and asked to identify themselves and to observe the other parties audio for line noise. One system capitalizes on the fact the ability of the caller to determine if the line is producing noise is in most cases far superior to that of the conference system. One method does not require evaluation to be done by the "controlling leg" (i.e. the moderator). That is, there is no need for a centralized authority which makes the decisions on line noise. Instead, each participant is asked to evaluate another participant.

1 Claim, 3 Drawing Sheets

CONFERENCE CALL PEER-DRIVEN DEGRADED LINE DETECTION AND REMOVAL

BACKGROUND OF THE INVENTION

An example of problems solved by this invention is how to deal with noisy lines on a conference call. In most conference call systems every endpoint is comprised of a handset. During these conference calls, many factors, including network traffic or other connection issues can cause a degraded signal. In general, this is not a problem for the other participants except in the case when the participant(s) who is having difficulty causes generation of audible noise in the conference call. This can be distracting, if not debilitating, for the other conference attendees. It would be useful if there was a way to pin point the problem connection and let that specific person know about it.

Today, there are two known solutions to this issue. In more expensive conferencing hardware, there are sometimes monitors included which can display which caller/callee is speaking, this can be used to determine which caller is sending audio traffic to the conference. Another solution is that the system can be set up to automatically inspect each individual line and determine which line is making noise. The system then mutes that "troublesome" line. These methods have some significant drawbacks. In the first situation with the monitor, the overall equipment cost is increased. The need for a separate monitor drives up cost as well as system complexity. In the second scenario, the main issue is creating an efficient system for detecting device noise. It can be difficult for the system to determine what lines are causing noise and the systems which do attempt to do so are clumsy and not reliable.

SUMMARY OF THE INVENTION

An embodiment of this invention is about a method of determining which line is causing noise based on peer feedback. Instead of relying on a special monitor or clumsy algorithms to determine which line is causing the noise, the participants of the call are paired up and asked to identify themselves and to observe the other parties audio for line noise. The system capitalizes on the fact that all callers are interested in removing the noise from the conference and that the ability of the caller to determine if the line is producing noise is in most cases far superior to that of the conference system. An embodiment of this invention addresses the issues of unjustly disconnection from the system by an uncooperative person. This method does not require evaluation to be done by the "controlling leg" (i.e. the moderator). That is, there is no need for a centralized authority which makes the decisions on line noise. Instead, each participant is asked to evaluate another participant.

DETAILED DESCRIPTION OF THE PREFERRED EMBODIMENTS

An embodiment of the system works by placing a function into the conference calling server (101) which can be activated by any conference call administrator (or possibly a user in a controlled environment).

Figure 1:
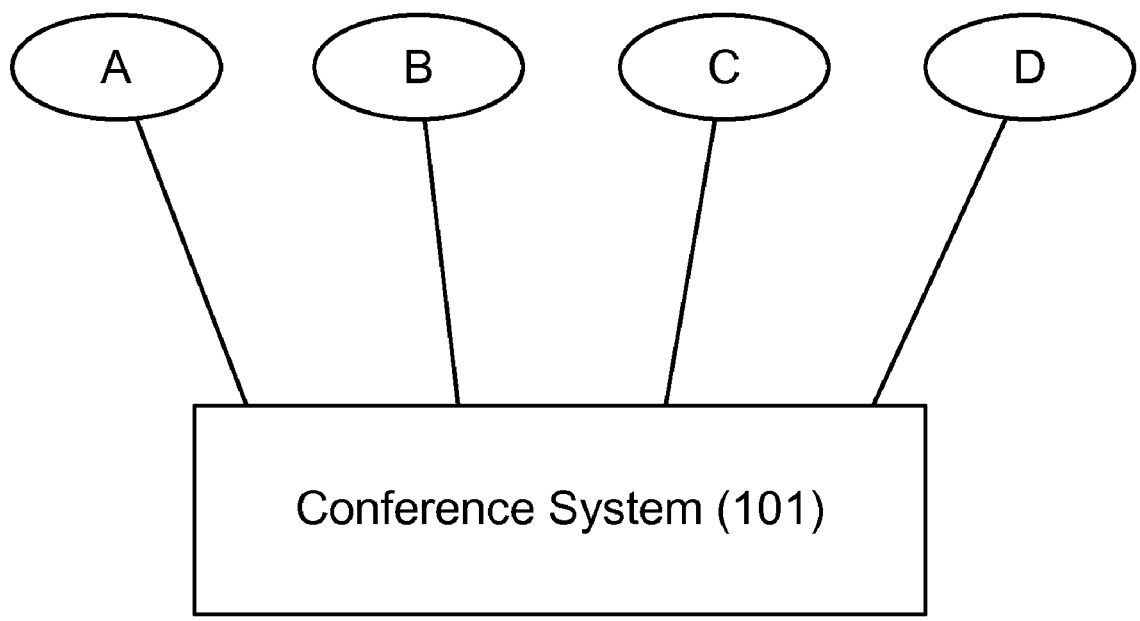
FIG. 1 illustrates the conference system and the participants.
Figure 2:
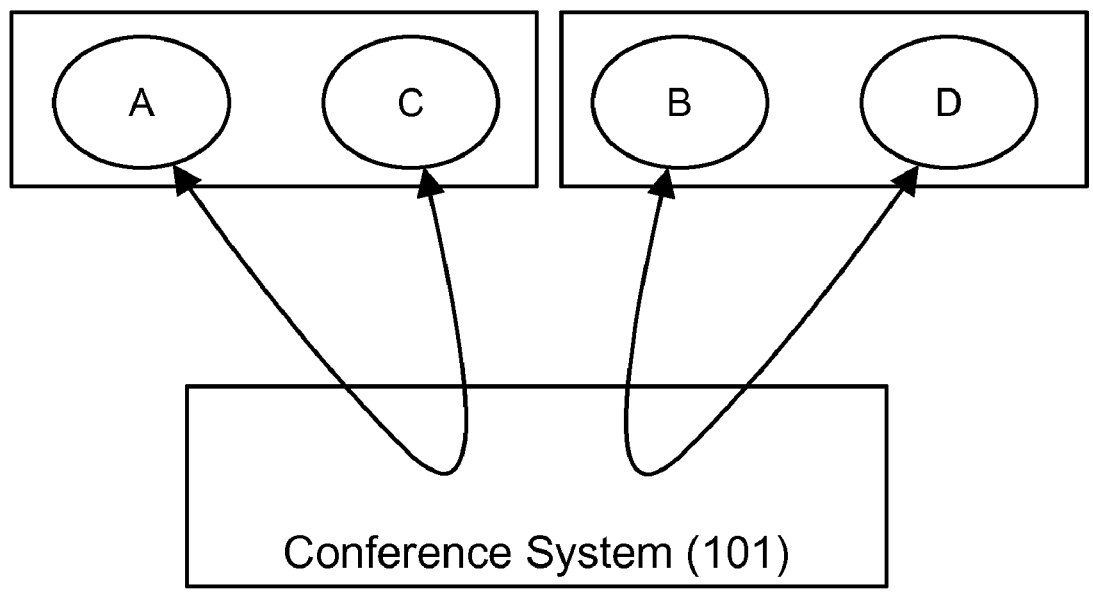
FIG. 2 illustrates the method for detecting the noisy/faulty line from the conference system as explained in the embodiments of the present invention.
Figure 3:
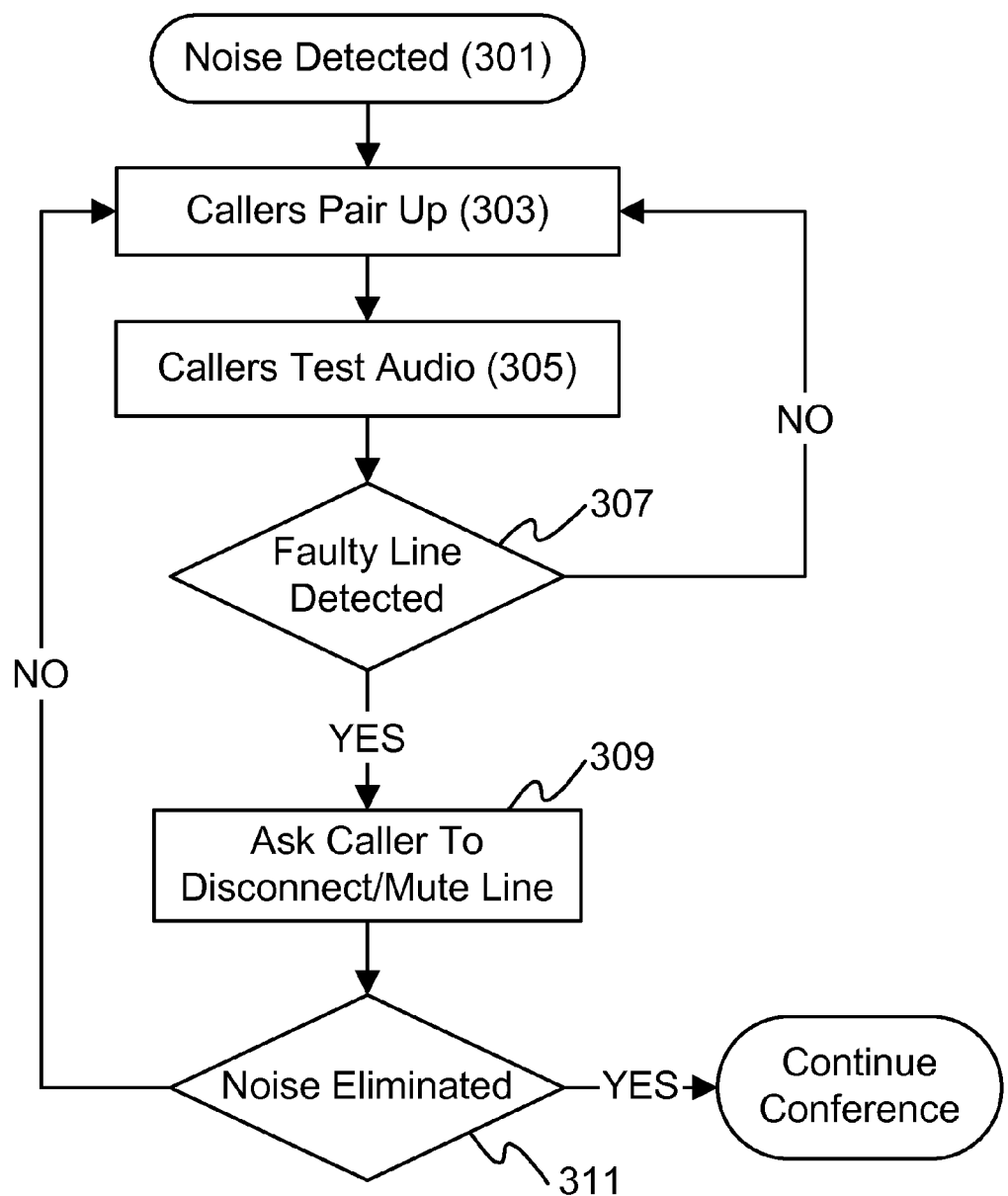
FIG. 3 shows a flow diagram of the processes involved in one embodiment of the present inventions as explained in the section of detailed description of an embodiment.

The following is an example of a conference call with 4 participants as shown in FIG. 1. The participants are A, B, C and D. In this case, user A is the admin. As shown in the flow chart of FIG. 3, if noise is detected (301) on the conference call and A decides (possibly after being asked by another caller) to start a peer driven search for a noisy line, the callers are paired up (303). As a result, for example A pair up with C and B pairs up with D as shown in FIG. 2. This could work for any number of users (although cases of odd number of participants demonstrate a special case as discussed below and is not shown in the figures).

In one embodiment, the audio between the paired participants are routed directly to each other (FIG. 2). The participants are asked to identify themselves and to listen to the audio quality of the other participant (305). They are prompted to, for example, hit "1" if the audio quality was good (no line noise) and "2" if it sounded like there was noise on the line. Any user that receives a "2" (307) is notified and, for instance, asked to disconnect from the conference or may opt to have his or her audio input muted for the conference (309).

In one embodiment, in the case of an odd number of participants, the last person would be connected to one of the members of the first pair (303) to finish evaluation and receive a positive ("1") rating. The last person would be asked to identify himself and then the already evaluated member would make a judgment. The last person would not have to evaluate anyone because he or she would be connecting to someone who has already been evaluated positively. As soon as someone has been evaluated positively, it automatically rejoins the conference which may be in progress. If they receive a "2" and choose to have their audio muted, they will also rejoin the conference.

In another embodiment, there might be needs to re-arrange or "re-pair-up" the participants if for some other issues, the noises are not detected correctly in the initial pair-up arrangement, if one or more participants are disconnected or muted unjustly, or if the noises are not eliminated completely at the end of the process (311), the callers can be re-arranged (303) for the process to be repeated.

An alternative implementation would be to have each caller be connected to an anonymous other conference caller. For example, callers A and C would pair-up as usual, but only C would be asked to identify him or herself. Then after A has made a decision about the noise in C's line, and when it is A's turn to identify itself, A is connected to a different user and identifies itself to the newly connected user. This way, C cannot take retaliatory action against A in case its line is disconnected by A. This would be helpful in situations where the participants of the call do not necessarily have an interest in being on the call.

In one embodiment, a method is presented for conference call peer-driven degraded line detection and removal in a conference call system. The exemplary system connects an administrator and a plurality of attendees, through a plurality of conference lines. In one example, the method comprises the following steps: The administrator starts a conference call, in which the administrator is the first attendee of the plurality of attendees on first conference line of the plurality of conference lines. The second attendee of the plurality of attendees, calls on second conference line of the plurality of conference lines. Then the first attendee on the first conference line is connected with the second attendee on the second conference line. The first attendee is asked to identify itself. The second attendee verifies the first audio quality of the first attendee.

If the first audio quality is good, the second attendee marks the first conference line of the first attendee "good." Otherwise, marks the first conference line "bad." The second attendee is asked to identify itself. The first attendee verifies second audio quality of the second attendee. If the second audio quality is good, the first attendee marks the second conference line of the second attendee "good," otherwise, marks the second conference line "bad." If the first conference line is marked good, the first conference line is connected to the conference call. If the first conference line is marked bad, the first attendee is asked whether to mute the audio, and if the first attendee agrees, the first conference line is muted, and the first conference line is connected to the conference call, and if the first attendee disagrees, the first conference line is disconnected. If the second conference line is marked "good," the second conference line is connected to the conference call. If the second conference line is marked bad, the second attendee is asked whether to mute audio, and if the second attendee agrees, the second conference line is muted, then the second conference line is connected to the conference call, and if the second attendee disagrees, the second conference line is disconnected.

Verification of audio quality is applied for all the plurality of attendees of the conference call. If total number of the plurality of attendees of the conference call is an odd number, the last attendee of the plurality of attendees' calls on the last conference line of the plurality of conference lines is verified by connecting to a conference line marked "good" and "verified."

A system, apparatus, or device comprising one of the following items is an example of the invention: conference call, lines, tel., VoIP, audio quality, quality measuring module, mute button, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of conference call and meeting management.

Any variations of the above teaching are also intended to be covered by this patent application.

The invention claimed is:

1. A method for conference call peer-driven degraded line detection and removal in a conference call system, wherein said system connects an administrator and a plurality of attendees, through a plurality of conference lines, said method comprising:

said administrator starting a conference call, wherein said administrator is first attendee of said plurality of attendees on first conference line of said plurality of conference lines;

second attendee of said plurality of attendees calling on second conference line of said plurality of conference lines;

connecting said first attendee on said first conference line with said second attendee on said second conference line;

asking said first attendee to identify itself;

said second attendee verifying first audio quality of said first attendee;

if said first audio quality is good, said second attendee marking said first conference line of said first attendee good, else marking said first conference line bad;

asking said second attendee to identify itself;

said first attendee verifying second audio quality of said second attendee;

if said second audio quality is good, said first attendee marking said second conference line of said second attendee good, else marking said second conference line bad;

if said first conference line is marked good, connecting said first conference line to said conference call;

if said first conference line is marked bad, asking said first attendee to mute audio, and if said first attendee agrees, muting said first conference line, then connecting said first conference line to said conference call, and if said first attendee disagrees, disconnecting said first conference line;

if said second conference line is marked good, connecting said second conference line to said conference call;

if said second conference line is marked bad, asking said second attendee to mute audio, and if said second attendee agrees, muting said second conference line, then connecting said second conference line to said conference call, and if said second attendee disagrees, disconnecting said second conference line; and applying verification of audio quality for all said plurality of attendees of said conference call;

wherein if total number of said plurality of attendees of said conference call is an odd number, last attendee of said plurality of attendees calling on the last conference line of said plurality of conference lines, is verified by connecting to a conference line marked good and verified.

* * * * *